Aug. 30, 1927. Re. 16,728

F. J. RENNER

RADIOGRAFONOLA

Original Filed April 18, 1922 5 Sheets-Sheet 1

Inventor
Frank J. Renner

By Mauro, Cameron & Lewis & Kerkam
Attorneys

Aug. 30, 1927. F. J. RENNER Re. 16,728

RADIOGRAFONOLA

Original Filed April 18, 1922 5 Sheets-Sheet 2

Inventor
Frank J. Renner

By Mauro, Cameron, Lewis & Perkins
Attorneys

Aug. 30, 1927. Re. 16,728

F. J. RENNER

RADIOGRAFONOLA

Original Filed April 18, 1922 5 Sheets-Sheet 3

Inventor

Frank J. Renner

By Mauro, Cameron, Lewis & Co. Reg.

Attorneys

Aug. 30, 1927. Re. 16,728

F. J. RENNER

RADIOGRAFONOLA

Original Filed April 18, 1922 5 Sheets-Sheet 4

Inventor

Frank J. Renner

By Mann, Carmichael, Lewis & Kerkam

Attorneys

Aug. 30, 1927. Re. 16,728

F. J. RENNER

RADIOGRAFONOLA

Original Filed April 18, 1922 5 Sheets-Sheet 5

Inventor

Frank J. Renner

By Mauro, Cameron, Lewis & Parker

Attorneys

Reissued Aug. 30, 1927. Re. 16,728

UNITED STATES PATENT OFFICE.

FRANK J. RENNER, OF MADISON, WISCONSIN, ASSIGNOR, BY MESNE ASSIGNMENTS, TO FINNEY B. SMITH, OF WASHINGTON, DISTRICT OF COLUMBIA.

RADIOGRAFONOLA.

Original No. 1,500,892, dated July 8, 1924, Serial No. 554,853, filed April 18, 1922. Application for reissue filed March 19, 1926. Serial No. 96,108.

This invention relates to a combination radiophone and talking machine equipment and cabinet therefor, and is what I term a radio grafonola.

In carrying out the present invention it is my purpose to provide a combination radiophone and talking machine outfit, wherein the amplifier of the radio apparatus and the tone arm of the talking machine or phonograph may be interchangeably connected with a single amplifying horn, so that the radiophone equipment may be operated when desired without disturbing the talking machine, and vice versa.

It is also my purpose to provide a combination of the class described which may be housed in a cabinet which will form an article of furniture, that may be placed in any part of a house and which will lend attractiveness to the room in which it is situated.

A further object of my invention is to provide a combination of radiophone and talking machine equipment which will embody proper circuit connections for the radio outfit and wherein the loop aerial may be properly adjusted for wave receiving purposes.

Another object of my invention is to provide a combination mechanism of the class described and a cabinet therefor, which will embrace the desired features of simplicity, durability and efficiency, and wherein the component parts will be so arranged and corelated as to be readily accessible and as to reduce the possibility of derangement to a minimum.

With the above recited objects in view, and others of a similar nature, the invention consists in the construction, combination and arrangement of parts set forth in and falling within the scope of the appended claims.

Figure 1:
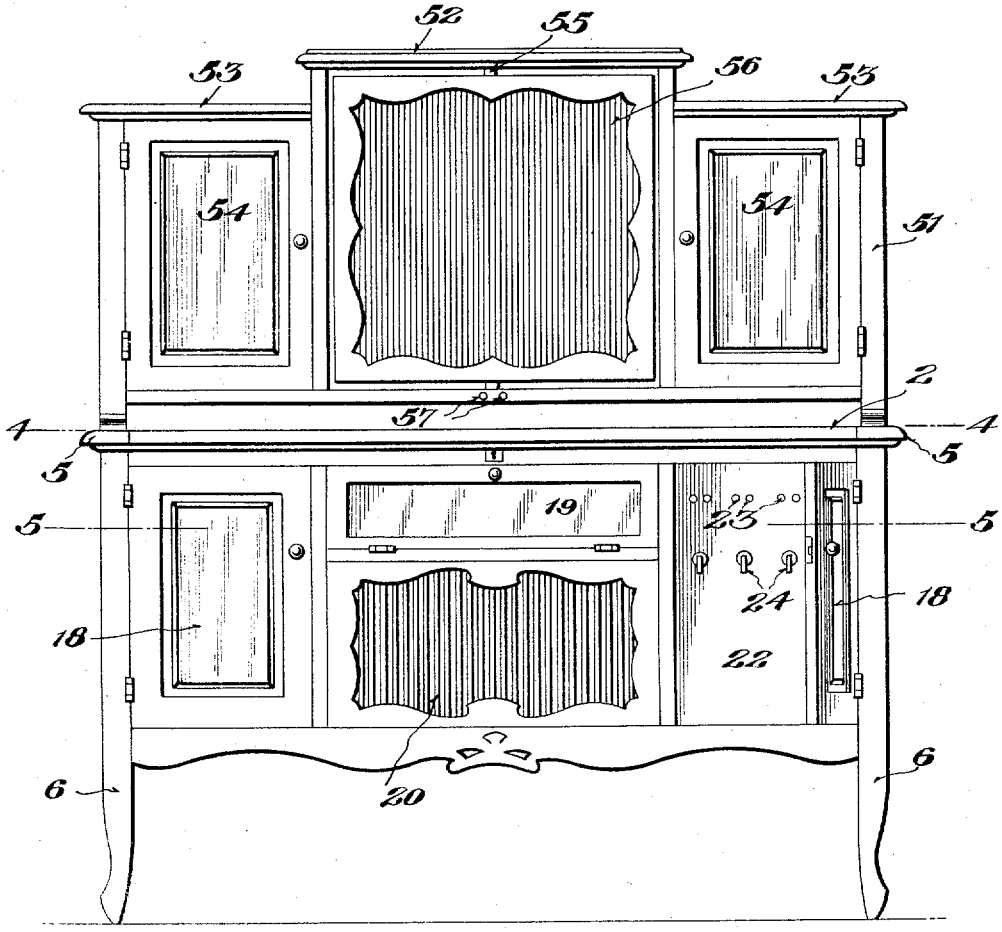
Figure 1 is a view in front elevation of a cabinet constructed in accordance with my invention and housing my improved mechanism.
Figure 2:
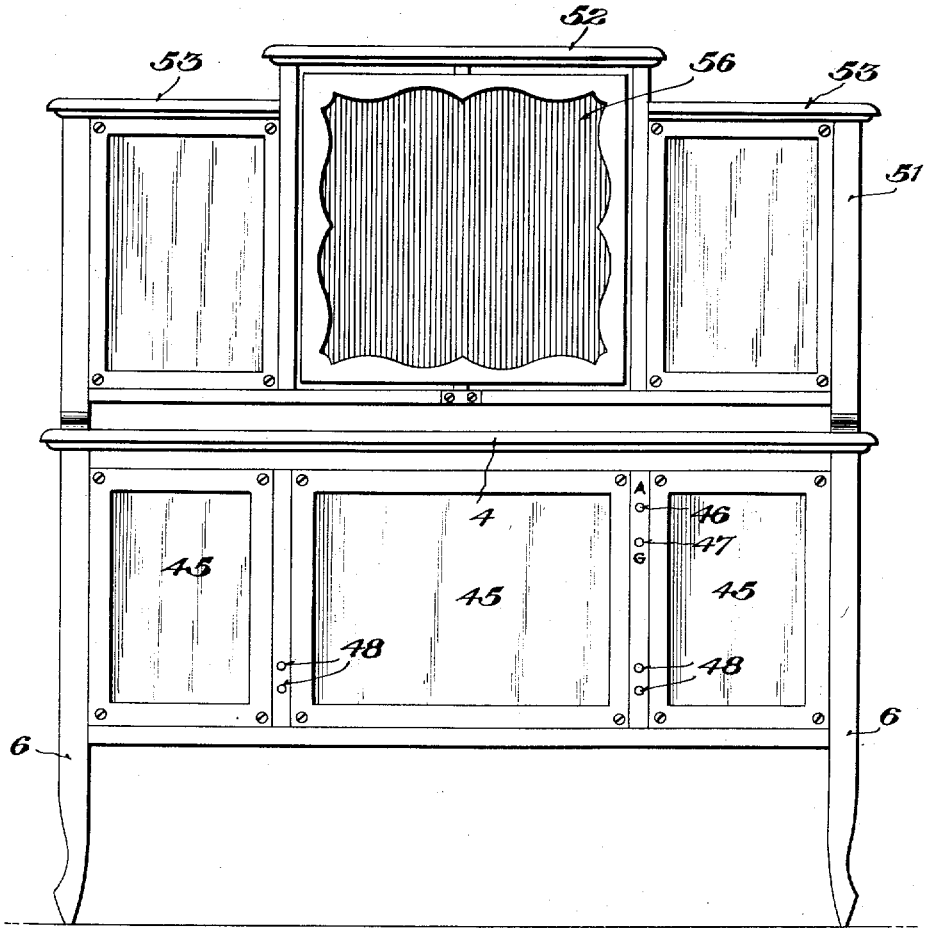
Figure 2 is a rear elevation of the same.

Referring now to the drawings in detail, 1 indicates a cabinet comprising a bottom, side and end walls and a cover 2 extending across the top of the cabinet and terminating short of the end walls thereof. The rear edge of the cover 2 is hinged as at 3 to a rear bar 4 that extends across the cabinet, while the ends of the cover lie in juxtaposition to end bars 5 and flush therewith.

The cabinet is mounted upon suitable legs 6 and in accordance with my invention is divided into a large central compartment 7 and comparatively small end compartments 8 and 9 by means of vertically arranged transverse partitions 10. The central compartment is subdivided into a small top portion and a comparatively large bottom portion by a horizontal partititon 11, and the top portion is formed into a small front section 12 and a large rear section 13 by a vertical partition 14. Across the top of the cabinet immediately below the cover 2 is a horizontal top plate 15 having the rear portion above the chamber or compartment 13 cut away as at 16 and formed at one side of the cut out portion with parallel cross slots 17 that form a rack for reproducing record disks.

Figure 3:
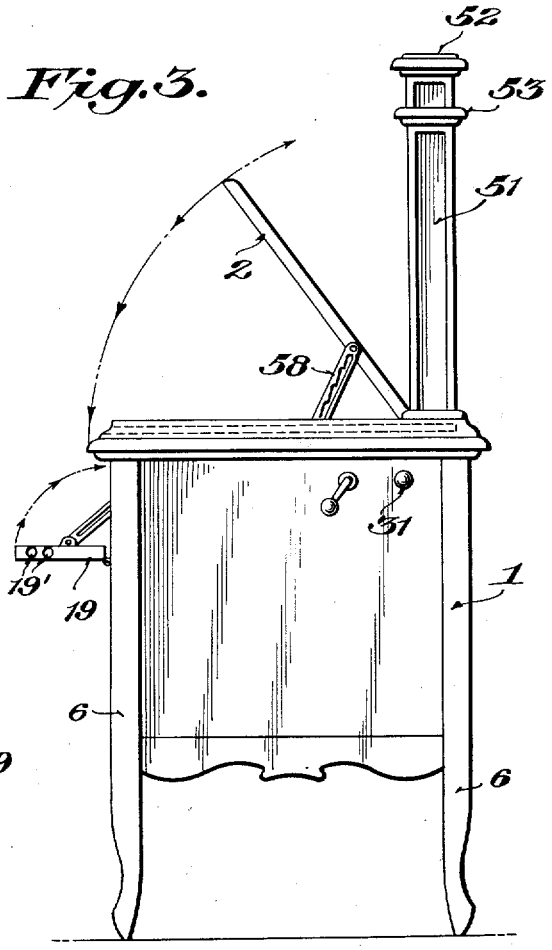
Figure 3 is a side elevation thereof, parts being shown in open position.
Figure 9:
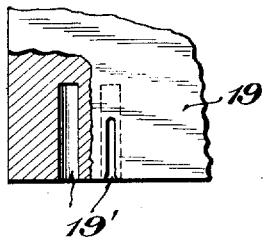
Figure 9 is an enlarged fragmentary view showing another detail of the invention.
Figure 4:
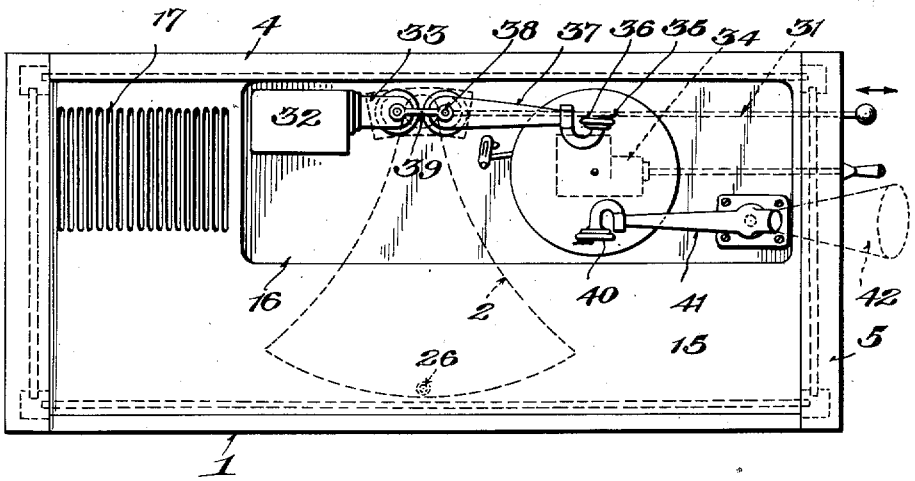
Figure 4 is a horizontal sectional view on the line 4—4 of Figure 1.

The front ends of the compartments 8 and 9 are closed by vertically swinging doors 18, 18 respectively, while the front of the chamber or section 12 is closed by a horizontally swinging door 19, whereby access may be had to the compartments and chamber. The front of the compartment 7 below the partition 11 is closed by an ornamental panel 20 formed with sound openings. When swung to horizontal position, as in Figure 3, the door 19 may be used as a writing table and is formed with pencil and pen holding sockets 19′, as shown more clearly in Figure 9.

Figure 5:
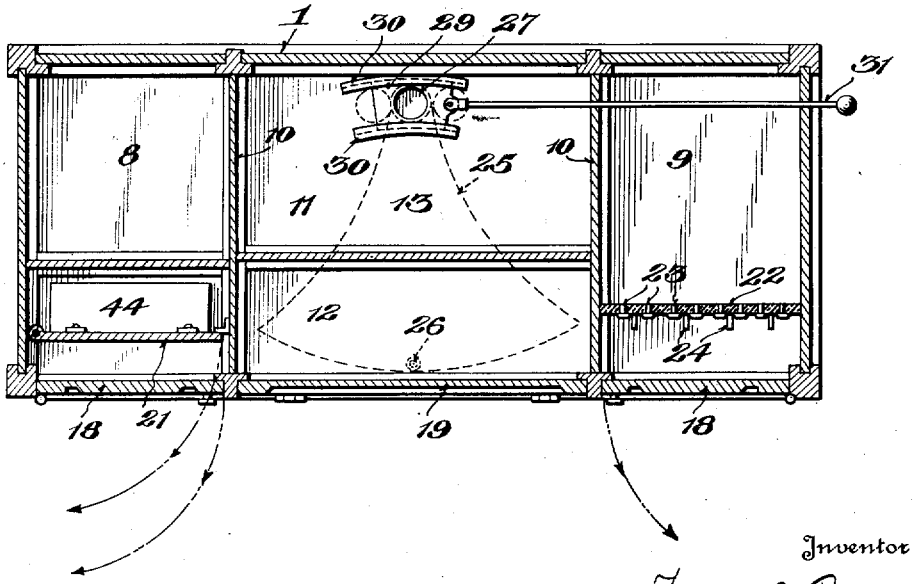
Figure 5 is a similar view on the line 5—5 of Figure 1.
Figure 6:
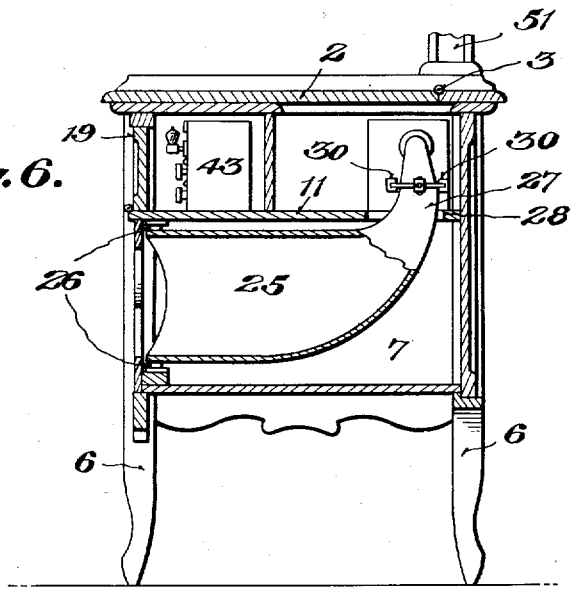
Figure 6 is a vertical sectional view through my improved cabinet.
Figure 7:
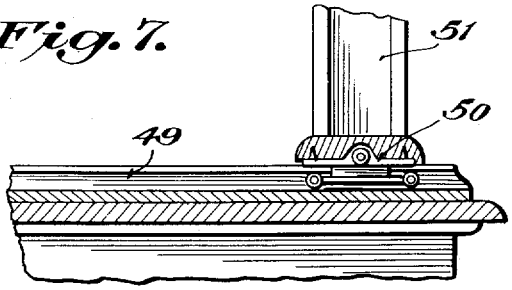
Figure 7 is an enlarged fragmentary sectional view showing the mounting for the superstructure carrying the loop aerial.
Figure 8:
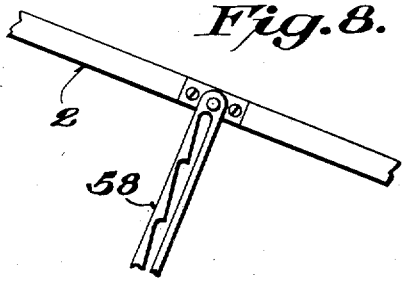
Figure 8 is a fragmentary view showing a detail of the invention.

Arranged in the compartment 8, a short distance behind the door 18 is a vertically swinging supporting panel 21 that may be swung outwardly after the door has been opened as indicated by the arrows in Figure 5 and arranged in the compartment 9 a short distance from the door thereof is a vertical panel 22 equipped with jacks 23 into which the plug of head phones may be inserted and with hooks 24 on which the head phones may be suspended when not in use, the jacks being suitably wired to the radio receiving apparatus hereinafter described.

An amplifying horn 25 is arranged within the lower portion of the compartment 7 and the forward end thereof is arranged adjacent to the panel 19 and formed with vertical axially alining pivot studs 26 journaled in suitable bearings carried by the top and bottom walls of the lower portion of the compartment. The rear end of the horn 25 terminates in an upwardly extending gooseneck 27 that projects through a slot 28 formed in the partition 11. The upper end of the gooseneck is connected with a guide plate 29 slidably mounted within horizontal guides 30 and connected with a shifting rod 31 extending out through one end wall of the cabinet.

This mounting of the horn constitutes a very important part of my invention and it will be seen that the construction just described permits the horn to be swung about its pivot so that the gooseneck may be moved to one side or the other of the normal center line of the horn for a purpose which will presently appear.

Mounted upon the partition 11 at the rear thereof and at one side of the slot 28 therein is a radiophone amplifier 32 of appropriate construction equipped with a downturned gooseneck 33 with which the gooseneck 27 on the horn 25 is adapted to register when the horn is swung in one direction by the shifting rod 31. Suitably secured to the under side of the partition 11 at the other side of the slot 28 therein is the motor mechanism 34 of a sound reproducing machine or phonograph. The driven shaft of this mechanism extends upwardly through the partition 11 and secured on the upper end thereof is a turn table 35 upon which the disk record to be reproduced is placed. Above the turn table is a reproducer 36 adapted to engage the record and equipped with a tone arm 37 terminating in a downturned gooseneck 38 arranged adjacent to the gooseneck 33 and adapted to register with the gooseneck 27 of the amplifying horn when the latter is swung to its other position. In the present instance the goosenecks 33 and 38 are connected to each other by a link 39.

Arranged above the turn table at a point diametrically opposite the reproducer 35 is a recorder 40 by which sound grooves may be formed in a record disk and connected with the recorder is a sound carrying arm 41 which in turn is connected with a sound concentrating horn 42 removably connected with the arm 41.

It is conceivable that the arrangement of the amplifier 32, sound reproducing mechanism and horn 25 may be varied and such is contemplated by me, the essence of this part of my invention residing in the adaptability or adjustability of the horn to both the radiophone amplifier and the phonograph.

For the purpose of my invention suitable radio receiving apparatus 43 is arranged within the chamber or section 12 and is connected with the amplifier 32, while suitable radio sending apparatus 44 is carried by the panel 21 for broadcasting purposes.

The necessary sources of electrical energy are arranged in the rear portions of the compartments 8 and 9 and the rear of these compartments and the central compartment are closed by removable panels 45, whereby access may be had to the rear of the compartments whenever necessary or desired.

Also on the rear of the cabinet is a jack 46 for connection with the outside aerial; a jack 47 for the ground connection and pairs of jacks 48 whereby storage batteries, if such are used for the source of current, may be connected with a charging line or circuit when necessary.

Suitably secured to the end rails 5, in the present instance, are track rails 49 parallel with each other and mounted upon each track rail and held thereon against accidental disconnection therefrom are carriages 50, respectively. Mounted upon the carriages 50 and fastened thereto is a superstructure 51 embodying in the present instance a central frame 52 and end compartments or chambers 53, the latter being provided with hinged doors 54, whereby access may be had thereto.

Mounted in the frame 52 upon vertical pivots 55 arranged centrally of the frame is a loop aerial 56 connected with jacks 57, whereby the loop aerial may be connected with the radio receiving set. The loop aerial may be swung about the pivots 55 to the proper position for wave receiving purposes while the superstructure may be moved toward the front of the cabinet to facilitate the swinging of the loop aerial.

The top 2 is provided with a supporting rack bar 58 whereby the top may be held open when desired.

In the use of my invention the loop aerial is swung to the proper position and the proper circuit connections made for the radio receiving set and in this use the gooseneck on the horn 25 is brought into registration with the gooseneck on the amplifier 32, thereby reproducing the concert, lecture or other matter being broadcasted or sent out.

When the radio apparatus is not in service, the horn 25 is swung to its other position so that selections rendered on the phonograph may be enjoyed.

For broadcasting purposes the radio set 44 is properly connected with the aerial.

It will be seen that I have provided a combination radio and phonograph cabinet which may be readily and quickly converted to either use and which in addition to its usefulness also forms a very neat and substantial article of furniture, which covers all the mechanism while permitting perfect enjoyment either as a phonograph or radio equipment.

While I have herein shown and described one preferred embodiment of my invention by way of illustration, I wish it to be understood that I do not limit or confine myself to the precise details of construction herein shown and described, as modifications and variations may be made within the scope of the claims and without departing from the spirit of my invention.

Having thus described the invention, what is claimed as new, is:—

1. In combination, a phonograph mechanism including a tone arm provided with a downturned gooseneck, a radio amplifier provided with a downturned gooseneck arranged adjacent to the first mentioned gooseneck and a horn formed with an upturned gooseneck movable into and out of registration with either of said first named goosenecks, and manual means for bringing the last mentioned gooseneck into and out of registration with either of said first named goosenecks.

2. In combination, a phonograph mechanism including a tone arm and a downturned gooseneck, a radio amplifier provided with a downturned gooseneck arranged in juxtaposition to the first named gooseneck, an amplifying horn pivoted upon a vertical axis provided with an upturned gooseneck movable into and out of registration with either of said first named goosenecks, a slidable plate connected with the gooseneck on said horn, an operating rod connected to said plate whereby the horn may be swung, and guide rails for said plate.

3. A cabinet construction for radiophone and talking machine apparatus, comprising a casing divided into a relatively large center compartment and end compartments, an amplifying horn movably mounted in said center compartment, a radiophone amplifier in said cabinet, a phonograph mechanism in said cabinet, and means for moving said horn in and out of communication with said radiophone amplifier and in and out of communication with said phonograph mechanism.

4. In combination, a phonograph mechanism including a tone arm provided with a downturned gooseneck, a radio amplifier provided with a downturned gooseneck arranged adjacent to the first-mentioned gooseneck, and a horn formed with an upturned gooseneck, said goosenecks being relatively movable for adjustment into and out of communication with each other.

5. In combination, a talking machine provided with a sound conduit, a radio mechanism provided with a sound conduit, and a sound amplifier formed with an inlet portion, said sound inlet portion and said sound conduits being mounted for relative sliding movement whereby said sound conduits may be selectively registered with the sound inlet of said amplifier.

6. In combination, a talking machine including a tone arm, a radio mechanism including a sound conduit, the outlet portions of said tone arm and sound conduit being juxtaposed, a sound amplifier having an inlet portion, and means whereby said outlet portions and said inlet portion may be moved relatively to selectively register either of said outlets with said amplifier inlet.

7. In combination, a talking machine including a tone arm, a radio mechanism including a sound conduit, means associating said tone arm and said sound conduit as a unit, a sound amplifier having an inlet portion, and means whereby said unit and said amplifier inlet may be moved relatively to selectively register either said tone arm or said sound conduit with said amplifier inlet.

8. In combination, a talking machine including a sound conduit, a radio mechanism including a sound conduit, a sound amplifier having an inlet portion, and means whereby said sound conduits and said amplifier inlet may be moved relatively to cause either of said sound conduits to selectively communicate with said amplifier.

9. In combination, a talking machine including a sound conduit, a radio mechanism including a sound conduit, said sound conduits having associated sound outlets constituting a unit, a sound amplifier having a sound inlet constituting a second unit, and a slide on which one of said units is mounted whereby said sound conduits can be made to communicate selectively with said amplifier.

10. In combination, a member provided with sound passages, talking machine reproducing means in communication with one of said passages, radio sound producing means in communication with another of said passages, a second member constituting a sound amplifier, and means whereby said members may be moved relatively to produce selective communication between said passages and said amplifier.

11. In combination, relatively movable members provided with sound passages, talking machine sound reproducing means in communication with one of said passages, radio sound producing means in communication with another of said passages, and a sound amplifier communicating with a third passage and selectively brought into communication with said first-named passages by the relative movement of said members.

12. In combination, a talking machine provided with a sound passage for the reproduced sound, a radio mechanism provided with a sound passage for the sound produced thereby, a sound amplifier, and means for selectively causing either of said sound passages to communicate with said sound amplifier.

13. A combined radio and talking machine apparatus including a cabinet, a sound amplifier in said cabinet, a radio mechanism in said cabinet, a talking machine including a sound conduit in said cabinet, and means whereby said radio mechanism and talking machine conduit and said amplifier may have relative movement to cause selective communication between said radio mechanism and talking machine conduit and said amplifier.

In testimony whereof I have signed this specification.

FRANK J. RENNER.